Sept. 4, 1956  C. W. EARP  2,762,043
RADIO NAVIGATION SYSTEMS
Filed Nov. 28, 1952  3 Sheets-Sheet 2
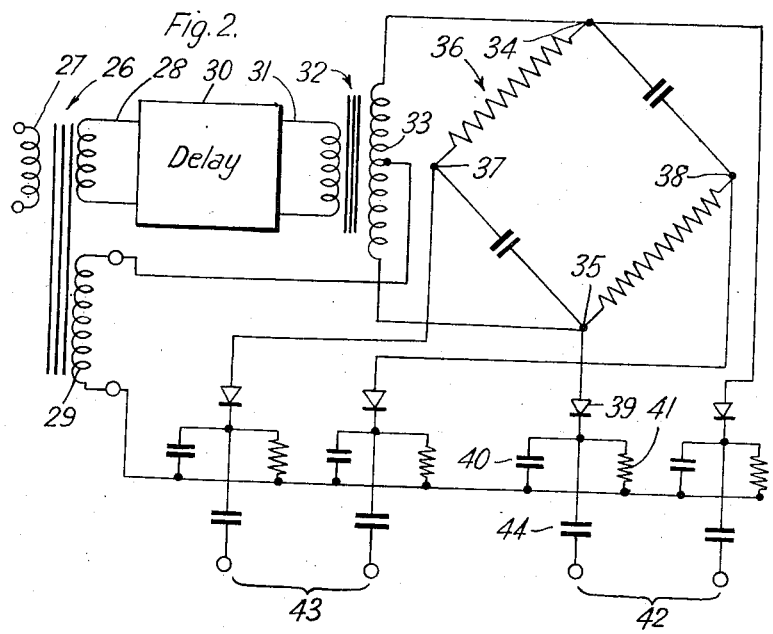
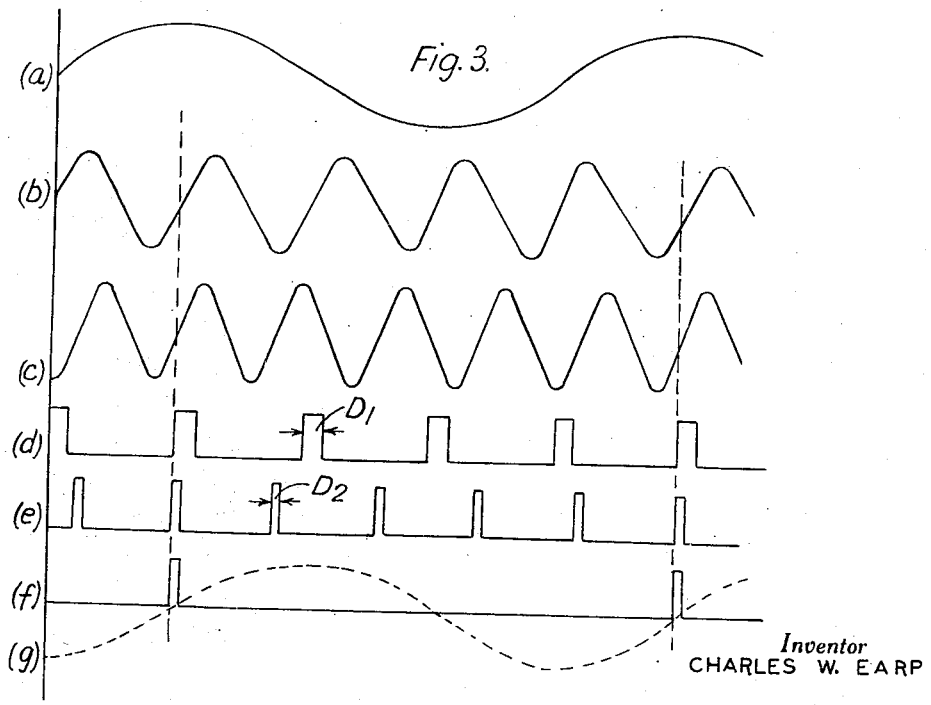
Inventor
CHARLES W. EARP
By Philip M. Bolton
Attorney

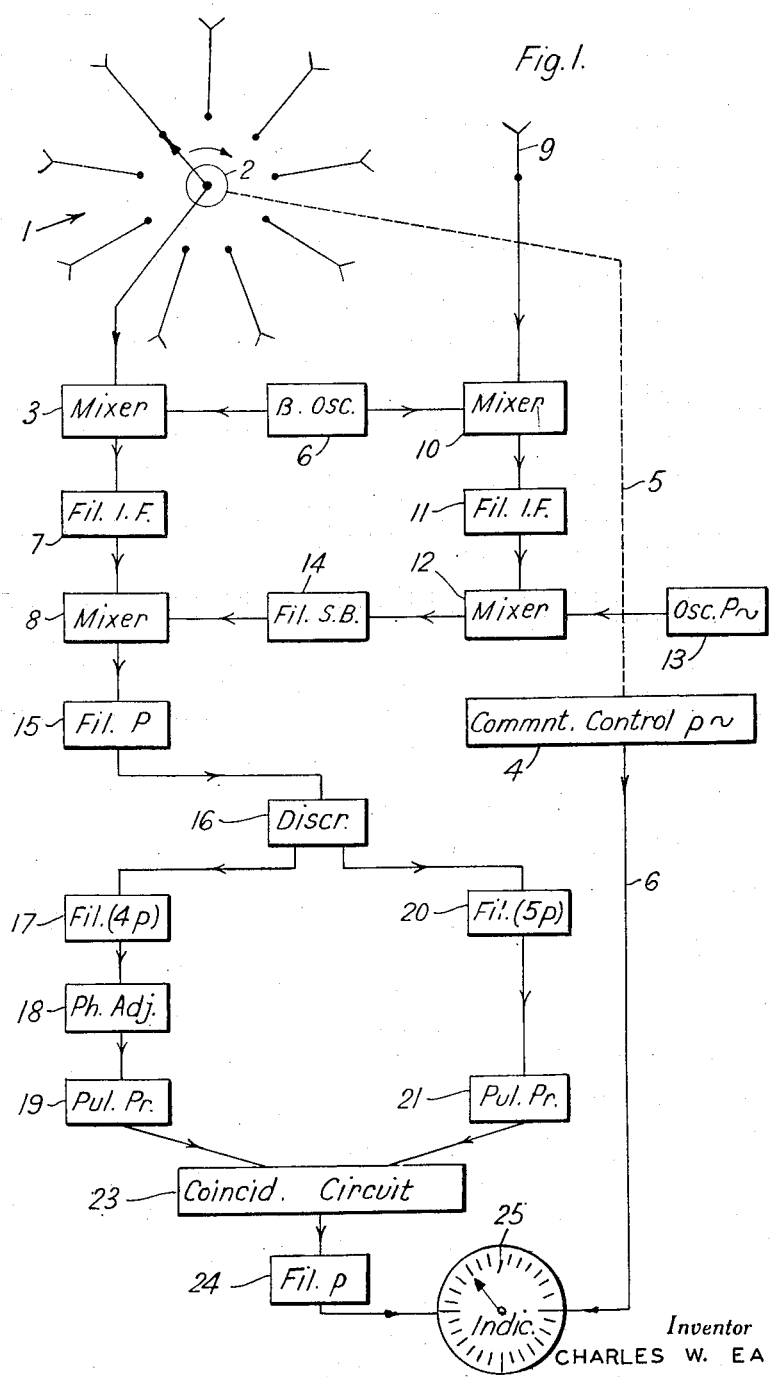

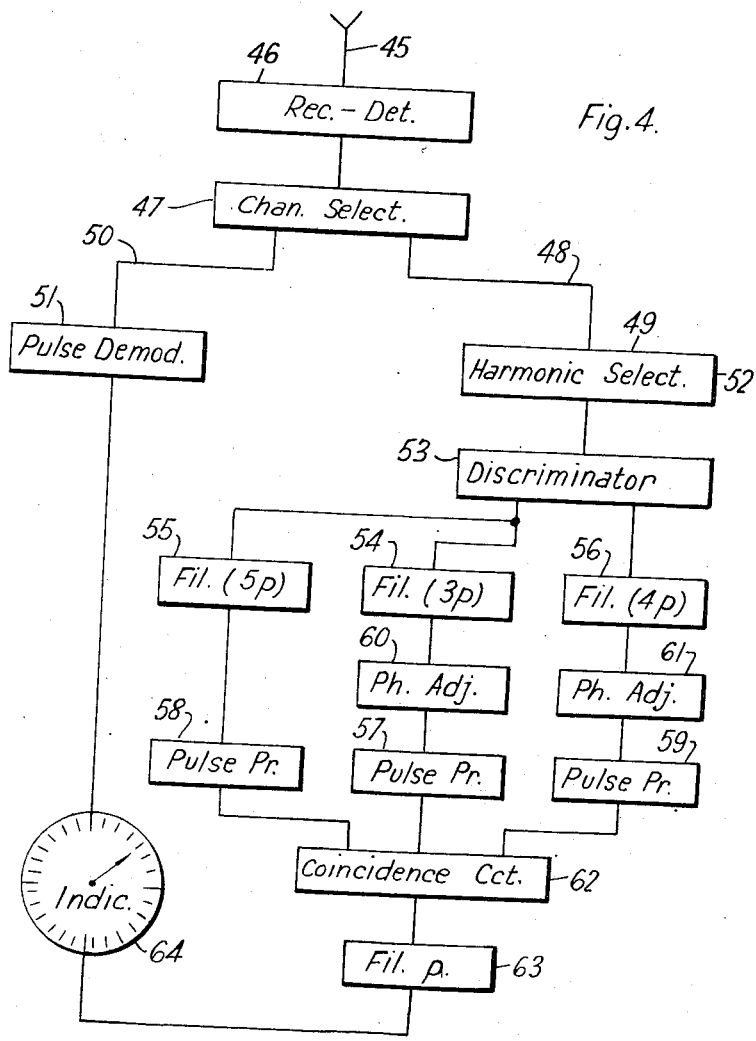

United States Patent Office 2,762,043
Patented Sept. 4, 1956

2,762,043

RADIO NAVIGATION SYSTEMS

Charles William Earp, London, England, assignor to International Standard Electric Corporation, New York, N. Y., a corporation of Delaware Application November 28, 1952, Serial No. 323,082

Claims priority, application Great Britain December 13, 1951

12 Claims. (Cl. 343—120)

This invention relates to radio-navigation systems of the type in which a directional indication is obtained at a receiving station with respect to a transmitting station by phase or time comparison between a reference wave and a comparison or bearing wave which is derived from the received energy.

More particularly, it relates to systems of the above type in which the received energy is phase or time modulated by reason of its being received over a space path the length of which is cyclically changed (either continuously or in step fashion), the comparison or bearing wave being obtained from the received energy by means including phase demodulation means, and the cyclical change in path length being obtained by cyclical change of the effective antenna position either at the transmitting station, in the case of a beacon system, or at the receiving station, in the case of a radio direction-finder. The change in effective antenna position may be obtained by using for example a single antenna which is mechanically swept round a horizontal circular path but is continuously coupled to its energising (or receiving) equipment, whereby a continuous variation of path length is established. Alternatively, a plurality of more than three fixed antennae spaced round a closed figure may be commutatively coupled to suitable energising (or receiving) equipment, whereby a step-function variation of path length is established. Examples of such commutated-antenna systems are disclosed in the specification of British Patent No. 594,530, British Patent No. 635,487 and British Patent No. 638,292, to which reference may be made for detailed descriptions.

As is well known, the effect of a change of amount $d$ in the path length of a radio wave is to change the timing of all components of the wave by an amount $T=d/c$, where $c$ is the velocity of propagation. If the wave is an unmodulated carrier wave, the change in timing corresponds simply to a shift of carrier phase by an amount $2\pi f.T$, where $f$ is the carrier frequency. If the wave is a carrier wave of frequency $f$, modulated in any manner at frequency $F$, the change in timing corresponds not only to a shift of carrier phase by amount $2\pi fT$, but also to a shift of modulation phase by amount $2\pi FT$. If therefore the change of path length is of a cyclically repeated simple harmonic nature, describable by for example $d=R \sin 2\pi pt$, where $p$ is the frequency of the cyclical change and $R$ its amplitude, the effect of such cyclical change is to phase-modulate the received carrier wave of frequency $f$ through an angle $\varphi \sin (2\pi pt+\alpha)$, where $\alpha$ is a phasing term and $\varphi=2\pi fR/c$, and also to phase-modulate the modulation wave of frequency $F$ through an angle $\theta=2\pi FR/c \sin (2\pi pt+\alpha)$. In radio navigation systems of the type outlined in the preceding paragraph, the phasing term $\alpha$ is determined by the direction of propagation of the received wave relative to a reference direction.

By extracting the envelope of this phase modulation from the received carrier wave of frequency $f$, as for example is done in the systems described in the aforementioned British Patents Nos. 594,530 and 638,292, a bearing wave of frequency $p$ can be obtained, which wave when phase-compared with a reference wave of the same frequency gives an unambiguous indication of the direction of propagation. Alternatively, the received carrier energy may be demodulated to yield the wave of modulation frequency $F$, which wave is itself phase modulated at frequency $p$, the phase of this phase modulation being likewise determined by the direction of propagation. For example, the arrangement described in the aforementioned British Patent No. 635,487 includes a beacon station having a circular array of antennae which are energised one at a time by respective pulses of a train of pulses i. e. the emitted wave is pulse modulated. At the receiver the received energy is detected to yield a pulse train which is phase modulated by virtue of the changes in path length. In this case the phase modulation is conveniently expressed not in terms of phase angle but in terms of pulse-time modulation, and demodulation of the pulses in accordance with known pulse technique yields a bearing wave of the same phase as if the phase modulation had been extracted from the carrier alone.

All such systems have the common characteristic that the bearing wave is derived from a phase-modulated wave, which may be either the carrier wave per se or a sub-carrier wave such as a pulse-train. As is well known, the sideband content of such a phase or time-modulated wave extends (theoretically) over the whole range of the frequency spectrum and is constituted by pairs of sidebands displaced from the carrier frequency by $\pm N(2\pi pt+\alpha)$, where $N$ is any integer, the amplitudes of the sidebands of order $N$ being proportional to the Bessel function of the first kind $J_N(\varphi)$, where $\varphi$ is the maximum phase excursion on either side of the mean value. If the change in path length is kept relatively small, so that $\varphi$ does not much exceed one radian, the sidebands of order $N=2$ and higher are of negligible magnitude, and the output of a phase discriminator to which such a wave is applied is substantially a linear function of the phase change, i. e., if the phase variation follows a sine wave of frequency $p$ the discriminator output is a sine wave of frequency $p$. As $\varphi$ is increased, the sidebands of order greater than unity gradually assume appreciable magnitudes, the discriminator output is no longer a linear function of the phase change, but contains terms corresponding to the higher order sidebands.

In prior art radio navigation systems dependent on phase modulation arising from cyclical change in the length of path travelled by radio energy, the aim has been to obtain a system in which the phase modulation is restricted to such a value that the output of the phase discriminator is a substantially linear function of the phase variation, corresponding to the sidebands of order unity. The sidebands of higher order have been deliberately kept small so as to have no appreciable influence on the linearity of the response, which takes the simple form of a sine wave of the same frequency as the cyclical change in the path length, and of phase unambiguously representative of the direction of propagation of the received radio energy. This restriction of phase modulation entails corresponding restriction of the aperture of the antenna system. Since, however, in directional systems the susceptibility to what is known as "site error" can be materially reduced by a substantially increase in the diameter, base line, or aperture of the antenna system, it is evident that the restriction or antenna aperture consequent on the need to use relatively low phase modulation is a disadvantage.

It is accordingly an object of the present invention to provide a radio navigation system of the type dependent on phase modulation arising from cyclical change in length of the path travelled by radio energy, in which the antenna aperture is not restricted by the requirement that the phase modulation must be limited to a value consistent with a linear response to change of phase.

In addition to the above mentioned advantage of reduced susceptibility to side error by using a large antenna aperture, a further advantage can be obtained by employing for the comparison wave a wave which is derived from the high order sidebands which are developed in useful magnitudes when the antenna aperture is sufficiently large. Consider for example the effect on the directional indication corresponding to a wanted signal due to a smaller signal, such as would be set up by a single reflecting obstacle, in the neighborhood of the antenna system by means of which the path length is cyclically changed. Let it be supposed that the amplitude of this interference is about one-tenth that of the wanted signal. Owing to the effective rotation of the antenna system an exactly similar set of component sidebands to these produced by the wanted signal will be produced by the interfering signal, except that each and every component arising from the interfering signal will have an amplitude only one-tenth that of the corresponding component of the wanted signal. The effect of the combination of the two signals is to produce summation components, which may be distorted from the "wanted" amplitude and phase by the maximum amounts of $-10\%$ in amplitude and $\pm 0.1$ radian ($\pm 6°$) in phase. In estimating the bearing from the phase of any particular order of sidebands the bearing error can evidently be anything up to $\pm 6°$, and if it is the first-order pair of sidebands which yields the bearing or comparison wave, this error of up to $\pm 6°$ will appear as such in the directional indication. If however it is, say, the fifth-order pair of sidebands that is used, the frequency of the bearing wave is five times that of the cyclical change of path length i. e., five cycles of the bearing wave correspond to one cycle of change of azimuth bearing, and the error is reduced from $\pm 6°$ in $360°$ to $\pm 6°$ in $1800°$, i. e. the error in bearing indication is reduced by the factor five, equal to the order of sidebands utilised. This reduction in error is however obtained at the expense of ambiguity, and to obtain the full benefit from using the high order sidebands it is necessary to provide some means for resolving this ambiguity so that the system yields a unique indication devoid of ambiguity but retaining high accuracy.

It is therefore another object of the present invention to provide a radio navigation system of the type dependent on phase modulation arising from cyclical change in length of the path travelled by the received energy, in which an unambiguous signal-direction indication is obtained by phase comparison between a reference wave and a wave derived from sidebands of order greater than unity resulting from said phase modulation.

According to the most general aspect of the invention there is provided a radio navigation system comprising means for receiving high frequency energy which is phase modulated at a given frequency by reason of cyclical change in the length of the space-path over which said energy is received, whereby said received energy includes sets of modulation sidebands of order higher than unity, and means for deriving from the received modulated energy a wave of said given frequency, the phase of which wave is determined by at least two sets of sidebands of different order and is unambiguously representative of the direction of propagation of the received energy.

According to a more particular aspect of the invention, there is provided a radio navigation system comprising at a receiving station means for receiving high frequency energy which is phase modulated at a given low frequency by reason of cyclical change in the length of the space path over which said energy is received, whereby said received energy includes sets of modulation sidebands of higher order than unity, means for deriving from said received modulated energy a plurality of trains of sharp pulses, each train timed by a different order of said modulation sidebands, said trains having respective repetition frequencies which are predetermined integral multiples of said low frequency, at least two of said multiples being prime to one another, means for relatively adjusting the timing of said trains to bring corresponding pulses of each train into overlapping time relationship, and means for applying the resultant coincidence-pulses for phase comparison with a reference wave of said given frequency, the result of said comparison being unambiguously representative of the direction of propagation of said received energy.

The invention will be better understood from the following description of two embodiments read in conjunction with the accompanying drawings, in which:

Fig. 1 illustrates a direction finding station according to the invention.

Fig. 2 illustrates a phase discriminator arrangement suitable for use in embodiments of the invention such as that illustrated in Fig. 1.

Fig. 3 illustrates certain waveforms to which reference is made in the explanation of Fig. 1.

Fig. 4 illustrates a beacon receiver embodying the principles of the invention.

Referring now to Fig. 1, which illustrates the essential elements of a short wave direction-finding station in accordance with the invention, there is indicated at 1 an array of nine antennae uniformly spaced round the diameter of a circle of approximately 17 metres radius. The individual antennae of array 1 are commutatively coupled one at a time, in regular cyclical succession, by means of commutator switch 2, to an input circuit of a mixer 3. Commutator switch 2 is operated by output from a commutation control unit 4, to which it is coupled by means symbolised by the dash-line 5, the frequency of complete commutation round the array being in the present instance $p=111.1$ c/s, each antenna in turn being coupled to mixer 3 for a period of one millisecond.

Control unit 4 also supplies, over line 6, a reference wave of frequency $p$ synchronised with the rotation of commutator switch 2. The commutator switch 2 may be of any suitable type, either electro-mechanical or electronic; the nature of the control unit 4 will of course depend upon the type of commutator switch actually used. Suitable commutating and controlling arrangements are disclosed in, for example, the already-mentioned Specification of British Patent No. 594530, to which reference may be made for a detailed description of these items.

Mixer 3, in addition to receiving the energy picked up in the antenna system 1, is fed with beating oscillator energy from oscillator 6, whereby the signal is converted to an intermediate frequency which is selected by means of intermediate frequency filter 7. The combination of mixer 3, oscillator 6 and filter 7 constitutes in effect one channel of a two-channel radio receiver. The output of this channel is fed to an input circuit of a second mixer 8.

In addition to the commutated antenna array 1 there is provided a single reference antenna 9 whose location is discussed hereinafter, coupled to an input circuit of mixer 10. The latter also receives input from beating oscillator 6, so that the energy received over antenna 9 is frequency-changed to the same intermediate frequency as the commutated antenna energy fed to mixer 3. The desired intermediate frequency output from mixer 10 is selected by intermediate frequency filter 11. The combination of mixer 10, oscillator 6, and filter 11 constitutes the second channel of the radio receiver. The output of this second channel is fed to an input circuit of mixer 12, which also receives energy from an auxiliary oscillator 13 of fixed frequency P. This auxiliary oscillator frequency is determined primarily by the value of the intermediate frequency taken from mixers 3 and 10, and is preferably of the order of one fifth thereof. Auxiliary oscillator 13 is preferably of a frequency-stabilised type, such as a crystal controlled oscillator.

The output of mixer 12 comprises upper and lower sets of sidebands resulting from beats between the intermediate frequency input from filter 11 and the input from auxiliary oscillator 13. One set of these sidebands, say the upper set, is selected by filter 14 and applied to an input circuit of mixer 8, in which it beats with the intermediate frequency energy derived from the commutated array via mixer 3 and filter 7. The output of mixer 8 includes, among other components, a wave corresponding to the frequency difference between the input from filter 14 and that from filter 7. This wave is selected by filter 15 and is of frequency P, identical with that of the stabilised auxiliary oscillator 13, and of phase-modulation determined by the changes in the instantaneous difference between the phase of the energy delivered to mixer 3 by the commutated antenna array 1 and the phase of the energy delivered to mixer 10 by antenna 9. The output of filter 15 is thus a wave of fixed frequency P which is phase-modulated, by reason of the commutation round the circular antenna array 1, at the commutation frequency $p$.

The phase-modulated wave output from filter 15 is now applied to a phase discriminator 16 which is arranged to deliver both the odd and the even harmonics of the phase-modulation frequency which result from beats in the discriminator between the carrier and the various sets of sidebands comprised in the frequency content of the input wave. A suitable type of discriminator is that illustrated in Fig. 2, to be described hereinafter.

The even-order harmonic output from discriminator 16 is applied to a filter 17 which selects say the fourth harmonic (frequency $4p$). Output from filter 17 is then applied through a phase adjuster 18, the use of which will be explained hereinafter, to a pulse-producing converter 19, which, by squaring and differentiating in accordance with well known pulse technique, converts the input wave from phase adjuster 18 into a train of Sharp 400 microsecond unidirectional pulses of repetition frequency $4p$. The odd-order harmonic output from discriminator 16 is applied to a filter 20 which selects a harmonic of order prime to the even order harmonic selected by filter 17; in the present example filter 20 selects the fifth harmonic (frequency $5p$). The output from filter 20 is then applied to a pulse-producing converter 21, of the same type as pulse-producing converter 19, wherein it is converted into a train of sharp 100 microsecond unidirectional pulses of repetition frequency $5p$.

The outputs from pulse-producing converters 19 and 21 are now applied to a "coincidence circuit" 23, which comprises a gating device of suitable known type arranged to release output only when a pulse from producer 19 and a pulse from producer 21 are applied thereto in overlapping time relationship. Adjustment of phasing unit 18 permits gating every fourth pulse from pulse producer 19 by every fifth pulse from pulse producer 21. The output from the coincidence circuit 23 takes the form of a train of pulses of repetition frequency $4p/4=5p/5=p$, i. e. of repetition frequency equal to the antenna commutation frequency. This train of pulses is applied to a low pass filter 24 by which it is converted to a sinusoidal wave of frequency $p$ constituting the comparison or bearing wave. The phase of this bearing wave is compared in indicator 25 with the phase of the reference wave of frequency $p$ supplied by the commutation control unit 4, the result of the phase comparison yielding an unambiguous indication of the direction of propagation of the received radio energy. Indication 25 is any convenient form of phase measuring device covering a range of 360° of phase difference, such as a dynamometer instrument or a cathode ray phase measuring equipment.

Turning now to Fig. 2, this illustrates the phase discriminator unit denoted by block 16 in Fig. 1. The discriminator comprises an input transformer 26 having a primary winding 27, to the terminals of which the wave to be discriminated is applied, and two output windings 28 and 29. Output winding 28 is coupled through a delay network 30 to the primary 31 of a differential transformer 32 the secondary winding 33 of which is connected across diagonally opposed corners 34, 35 of a conventional phase-splitting resistance-capacity bridge network 36. Delay network 30 is such that the phase shift therein is 90° or some odd multiple thereof. One terminal of output winding 29 of the input transformer 26 is connected to the center point of secondary winding 33 of differential transformer 32, so that the E. M. F. induced in winding 29 is applied to all points in the bridge network 36 cophasally. Each of the four corners 34, 35, 37, 38 of the bridge 36 is connected to the other end of secondary winding 29 through a respective rectifier in series with a respective parallel resistance-capacity combination as indicated for one corner at 39, 40, 41. Delay network 30 is such that the E. M. F. induced in secondary winding 33 is in quadrature with the E. M. F. applied to the centre point of winding 33 from winding 29 when the input wave applied to winding 27 is of stationary phase. The output of the discriminator is divided between two pairs of output terminals 42 and 43, the terminals of pair 42 being connected through blocking condensers, one of which is indicated at 44, to the output sides of the rectifiers which are energised from opposed corners 34 and 35 of bridge 36, and the terminals of pair 43 being similarly connected to the output sides of the rectifiers which are energised from opposed corners 37 and 38 of bridge 36.

Disregarding for the moment the apparatus energised from corners 37 and 38 of bridge 36, together with the elements comprised in the bridge itself, it will be observed that the whole of the remaining apparatus illustrated in Fig. 2 constitutes a known type of phase demodulator arranged to give, in response to an input wave which is phase modulated over the range $\varphi \sin 2\pi pt$, an output which is proportional to $$\sin(\varphi \sin 2\pi pt) = 2J_1(\varphi) \sin 2\pi pt + 2J_3(\varphi) \sin 6\pi pt + 2J_5\varphi \sin 10\pi \sin pt + \ldots$$

This output is delivered at terminals 42, and is that part of the total discriminator output which contains odd harmonics arising from beats between the carrier component and the odd-order side band components of the modulated input wave. In the case of the particular direction finding station illustrated in Fig. 1 it is this output which is applied to filter 20, since it is this output which contains the desired fifth harmonic.

Returning to Fig. 2, the addition of phase splitting bridge network 36 and the apparatus connected to corners 37 and 38 thereof does not in any way modify the nature of the output delivered at terminal 42. The functions of this additional apparatus is to provide at terminals 43 a demodulation output differing from that delivered at terminals 42 in that one of the two waves applied to the rectifiers has been phase-shifted by 90°, so that the rectifier output is proportional to $$\sin(\varphi \text{ dem } 2\pi pt + 90°) = \cos(\varphi \sin 2\pi pt) = J_0(\varphi) + 2J_2(\varphi) \sin 4\pi pt + 2J_4(\varphi) \sin 8\pi pt + \ldots$$

Since the steady component $_0(\varphi)$ is suppressed by the blocking condensers, the discriminator output at terminals 43 comprises only even order harmonics arising from beats between the carrier component and the even-order sideband components of the modulated input wave. In the case of the particular direction-finding station illustrated in Fig. 1 it is this output which is applied to filter 17, since it is this output which contains the desired fourth harmonic.

It should perhaps be emphasized that the appearance of these harmonics in the discriminator output does not arise from distortion by the discriminator rectifier elements, but merely reflects the complex character of a phase-modulated wave.

On consideration of Fig. 2 it will be seen that the arrangement shown therein is effectively a combination of two discriminators of normal type, in one of which the unmodulated differentially combined voltages are in quadrature phase relationship, whereby the differential rectifier output includes only the odd-order harmonics, while in the other one the unmodulated differentially combined voltages are cophased, whereby the differential rectifier output includes only the even-order harmonics. Returning now to Fig. 1, it will be observed that the energies from circular array 1 and single reference antenna 9 are converted to the same intermediate frequency without relative change of phase, since the frequency conversions in the two receiving channels are accomplished by the aid of one and the same beating oscillator 6; whatever change occurs in the frequency or phase of oscillator 6 will effect both the intermediate frequency outputs (from filters 7 and 11) to precisely the same extent. It will also be observed that by beating the commutated antenna I. F. output from filter 7 against the upper sideband energy resulting from beating the single antenna I. F. output from filter 11 against output from the auxiliary frequency-stabilised oscillator 13, there is obtained at the output of filter 15 a wave which has the same frequency P as that of the auxiliary oscillator 13. The phase of this wave has a steady component dependent wholly on the phase of the stabilised oscillator, and another component which is the instantaneous phase difference between the energy picked up via the commutated array 1 and that picked up via the single antenna 9, and is therefore modulated only by reason of the change in path as the commutating arrangement couples each in turn of the separate antenna of array 1 to mixer 3. It is to be particularly noted that any phase-modulation which may have been applied to the received energy at the distant transmitter does not appear as a modulation of the wave outcoming from filter 15, since such modulation would affect the energy received by the single reference antenna 9 to exactly the same extent as it would effect the energy picked up by the simultaneously connected one antenna of array 1, and would not modify in any way the instantaneous phase difference between the two active antennae. The arrangement is therefore particularly suitable for dealing with signals which are of incoherant phase, such as signals from a keyed or pulsed oscillator, or with signals which are phase or frequency modulated at the transmitting source. Another advantage of the arrangement is that since the signal to be demodulated always has the same centre frequency P, that of the stabilised auxiliary oscillator, it is possible to use a sharply tuned discriminator circuit even though the frequency of the transmitter source is not stabilised.

Referring now to Fig. 3 this shows, on the same time scale, but without regard to the fixed phase shifts in the apparatus, various wave-forms utilised in the direction-finder illustrated in Fig. 1. Curve $a$ illustrates the reference wave supplied by the commutation control unit 4 (Fig. 1) over line 6 to indicator 25. As already mentioned this reference wave is of the same frequency $p=111.1$ c./s. as the antenna commutation, and timed or phased with respect thereto. Curve $b$ of Fig. 3 illustrates the fourth harmonic wave, frequency $4p=444.4$ c./s., delivered by discriminator 16 (Fig. 1) to filter 17, while curve $c$ of Fig. 3 illustrates the fifth harmonic wave, frequency $5p=555.5$ c./s. delivered to filter 20. Curve $d$ of Fig. 3 illustrates the pulse train derived in pulse-producing converter 19 (Fig. 1) from the fourth harmonic wave fed thereto via phase adjuster 18, while curve $e$ shows the pulse train derived in pulse producing converter 21 (Fig. 1) from the fifth harmonic wave fed thereto from filter 20. It will be observed that the pulses of waveform $e$—the fifth harmonic pulses—have been made narrower than the pulses of waveform $d$. Curve $f$ of Fig. 3 shows the coincidence pulse train obtained by the joint gating in coincidence circuit 23 (Fig. 1) of the fourth and fifth harmonic pulse trains the wave forms of which are illustrated by curves $d$ and $e$. This train is comprised of pulses the timing of which is determined almost entirely by the narrower of the gated pulses i. e. by the fifth harmonic pulses and is of pulse repetion frequency $p=111.1$ c./s., since every fourth pulse of the fourth harmonic train, curve $d$, overlays in time every fifth pulse of the fifth harmonic train, curve $e$. The pulses of curve $f$ are converted by means of filter 24 (Fig. 1) to a sinusoidal wave of frequency $p=111.1$ c./s., as illustrated by curve $g$ of Fig. 3, and an unambigous indication of the direction of propagation of the received energy is obtained by phase comparison, in indicator 25 (Fig. 1) of the waves illustrated by curves $a$ and $g$ of Fig. 3.

On consideration of the pulse train curves $d$ and $e$ of Fig. 3 it will be seen that, in order to ensure that pulse coincidence cannot occur more than once in each commutation cycle, it is necessary that in neither train is the pulse duration made greater than the difference between the repetition periods of the two trains i. e. greater than 450 microseconds for pulse trains of repetion frequencies 444.4 c./s. and 555.5 c./s. In the present embodiment, the pulse duration $D_1$ for the train of lower repetition frequency (that derived from the fourth harmonic) has been made 400 microseconds i. e. a relatively large fraction of the 450 microsecond difference between the repetition periods. For the train of higher repetition frequency the pulse duration $D_2$ has been made equal to 100 microseconds, a relatively small fraction of the difference between the repetition periods, so that the timing of the coincidence pulses shown in curve $g$ of Fig. 3 is determined almost entirely by the phase of the higher of the two harmonics selected from the discriminator output. The main function of the pulse train derived from the fourth harmonic then becomes merely one of gating, and it becomes permissable to adjust the timing of this gating train so as to make sure that the desired fifth harmonic pulses are fully passed in the coincidence circuit. It is in order to provide for this timing adjustment that the equipment includes the phase adjuster unit 18 of Fig. 1. The range to be covered by this phase adjuster is small, not exceeding say 45°, and once the adjuster is set it should normally be unnecessary to change it, change of direction of propagation will shift both trains of pulses together with little or no relative shift between the trains.

In considering the operation of the system illustrated in Fig. 1 it must be borne in mind that the "step" nature of the commutation round the circular array 1 does not alter the performance as so far described; the discriminator output consists of a group of stopped waves rather than sinusoidal waves, but the steps provided by the nine antennae of the array are sufficiently numerous to enable the desired sine waves to be obtained at the outputs of filters 17 and 20 (Fig. 1).

It must also be borne in mind that the relative amplitude of any given order of modulation sidebands is a fraction of the phase excursion, and may be negligible for certain values of excursion. The variation of relative sideband amplitude with phase excursion is illustrated by the following (Bessel function) Table I, over the range of phase excursion between $\varphi=1$ and $\varphi=7$, for the first eight orders of sideband.

TABLE I

Values of $J_N(\varphi)$

| N | $\varphi=1$ | $\varphi=2$ | $\varphi=3$ | $\varphi=4$ | $\varphi=5$ | $\varphi=6$ | $\varphi=7$ |
|---|---|---|---|---|---|---|---|
| 1 | +.440 | +.577 | +.339 | -.066 | -.328 | -.277 | -.004 |
| 2 | +.115 | +.353 | +.486 | +.364 | +.047 | -.243 | -.301 |
| 3 | +.020 | +.129 | +.309 | +.430 | +.365 | +.115 | -.168 |
| 4 | +.002 | +.034 | +.132 | +.281 | +.391 | +.358 | +.158 |
| 5 | 0 | +.007 | +.043 | +.132 | +.261 | +.362 | +.348 |
| 6 | 0 | +.001 | +.011 | +.049 | +.131 | +.246 | +.339 |
| 7 | 0 | 0 | +.002 | +.015 | +.053 | +.130 | +.224 |
| 8 | 0 | 0 | 0 | +.004 | +.018 | +.056 | +.128 |

Now if the radius $\Omega$ of the circular array is fixed, the phase excursion will vary with the wavelength λ according to the equation $$\varphi = \frac{2\pi \Omega}{R}$$

Taking λ as 21 metres, and Ω as approximately 17 metres, φ is equal to 5 radians. On examining Table I it will be seen that if we neglect sidebands having relative amplitudes of less than 0.2 as being too small for practical use, the only useful sidebands are those of the first, third, fourth, and fifth orders, which are all prime to one another. The arrangement illustrated in Fig. 1 is therefore particularly suitable for this condition (Ω=17 meters, λ=21 metres) since it includes filters 17 and 20 which are specifically arranged to select the harmonic waves derived in the discriminator 16 from the sidebands of the fourth and fifth order. The phase of the comparison wave is fixed almost entirely by the fifth order sidebands, which gives a reduction of maximum site error to one fifth of that possible were only the first order sidebands utilised. By changing the filters following discriminator 16 it would be possible to select the third and fourth harmonics and derive the comparison wave from the fourth harmonic; but this would not give so great an improvement in reduction of site error. Another alternative arrangement would be to gate the fifth harmonic pulses by means of pulses derived from the first harmonic (fundamental); this arrangement however is not preferred, since in general the gating pulses should be derived from as near as possible the same order of sidebands as is used to produce the comparison, so that the timing of the coincidence pulses may be determined from two trains both having reduced susceptibility to site error.

If the system is to be used on a wavelength of 26 metres, without changing the radius of the array, the phase excursion φ becomes 4 radians, and reference to Table I shows that the sidebands of useful magnitudes are those of the second, third, and fourth order. In this case the post-discriminator circuits must be changed to produce the required pulses from (preferably) the third and fourth harmonics, the pulses from the third harmonic being the relatively broad gating pulses. A possible but not recommended alternative is to produce the pulses from the second and third harmonics. The second and fourth harmonics do not constitute a usable combination, since the multiples two and four are not prime to one another and the coincidence pulses would give a wave of twice the reference frequency and having therefore two ambiguities. It will be observed that at this wavelength the first order sidebands are so small that any fundamental or first harmonic wave delivered by the discriminator would give quite unreliable (though unambiguous) indications; this situation arises because of the relatively large antenna aperture.

The most suitable choice of side-band orders, and hence of harmonic filters 17 and 20 Fig. 1 can similarly be determined for other wavelength. Typical selections are given in Table II for different values of antenna aperture i. e. the diameter in wavelengths of the circular array.

TABLE II

| Aperture | φ, radians | Order of sidebands |
|---|---|---|
| .64λ | 2 | 2, 1 |
| .96λ | 3 | 3, 2 |
| 1.26λ | 4 | 4, 3 |
| 1.57λ | 5 | 5, 4 |
| 1.89λ | 6 | 6, 5 |
| 2.3λ | 7 | 7, 6 |

With regard to the right-hand column of Table II, it is to be understood that, for any one aperture, of the two orders of sidebands listed it is preferable that the higher should be used in obtaining the relatively narrow pulses corresponding to curve e of Fig. 2, the other being used in obtaining the broader "gating" pulses corresponding to curve d of Fig. 2.

In the description of Fig. 1 the discriminator 16 has been described as arranged to deliver both the odd and the even harmonics of the phase-modulation frequency. Reference to Table I will show that in some instances it may be possible to use a discriminator arrangement giving only the odd harmonics. For example, in the case of φ=5 radians it would be possible to use the harmonics derived from the third and fifth order sidebands, since three and five are prime to one another, and the sidebands of these orders are of useful magnitude when φ=5 radians. In no case however is it possible to use a discriminator giving only the even harmonics, since no two even numbers are prime to one another.

The location of reference antenna 9, Fig. 1, is not critical, except that care should be taken that it does not react differently on the different antennae of array 1, and thereby create a species of site error. This possibility can be overcome, either by locating the reference antenna 9 sufficiently far from the nearest point of the array 1—say at twice the longest operating wavelength—as to ensure that any reaction is negligible. Alternatively, and often more conveniently, the reference antenna 9 may be placed at the centre of circular array 1, whereby any reaction from the reference antenna will affect each antenna of the array to exactly the same extent, and there will be no differential reaction to affect the accuracy of the indication.

While in the embodiment described with reference to Fig. 1 the comparison between the bearing and reference waves is effected as a phase comparison between sinusoidal waves, it will be appreciated that it might equally well be effected as a timing comparison between the train of coincidence pulses supplied by the coincidence circuit 23 and a train of pulses of the same repetition frequency obtained directly or by derivation from the commutation control unit 4.

In the embodiment of the invention which is illustrated in Fig. 1 use is made of the phase modulation of a carrier wave resulting from the cyclical change of length of the path over which the energy is received. There will now be described another embodiment of the invention, in which the modulation utilised is not that of a carrier wave per se, but of a modulation applied to the radio energy at the transmitting source. This embodiment is illustrated in Fig. 4, which shows a beacon receiving station suitable for use in a beacon system such as is disclosed in the specification of British Patent No. 635,487 to which reference has already been made. Briefly, there is described and claimed in the said specification No. 635,487:

(a) A radio navigation system comprising at a beacon station an array of at least three antennae equally spaced round the circumference of a circle, an antenna located at the centre of said circle, means for transmitting as a bearing signal consecutive equi-spaced pulses of energy from consecutive antennae of said array in regular progression, means for transmitting from said central antenna as a reference signal a series of pulses of energy so relatively timed and interleaved in correspondence with said equi-spaced pulses of energy as to be cyclically varied in relative timing in substantially the same manner as the pulses of energy receivable from said antenna array at a distant point in a particular direction, and means for transmitting from said central antenna synchronising pulses of energy of distinctive pulse characteristic;

(b) A radio navigation system comprising in a mobile station means for receiving energy from a radio beacon as described in (a) above, means for demodulating said received energy to yield interleaved trains of pulses corresponding respectively to said bearing signal, to said reference signal, and to said synchronising pulses of energy of distinctive characteristic, means responsive to said synchronising pulse trains for separating out said bearing signal pulse trains and said reference signal pulse trains, means for extracting the time-modulation of the pulses of each of said separated-out trains to yield a bearing-signal wave and a reference-signal wave of the same relatively low frequency, and means for comparing the phases of said low frequency waves, the result of said phase comparison yielding the azimuth bearing of said mobile station relative to said beacon.

The beacon receiving station illustrated in Fig. 4 is intended for cooperative association with a beacon as set out in (a) above, in which beacon the array comprises nine antennae equally spaced round the circumference of a circle of radius 450 metres, and in which the bearing signal is transmitted as a train of unmodulated 1 microsecond pulses of 10 kc./s. repetition frequency by commutative energisation of successive antennae by successive pulses, complete commutation round all the antennae of the array occurring at a frequency of $p=1111$ c./s., while the reference signal is transmitted from a centre antenna as a train of 1 microsecond pulses of 10 kc./s. repetition frequency position modulated by a wave of frequency $p$ (i. e. the same frequency as that of the commutation round the array) and of predetermined phase.

Referring now in detail to Fig. 4, the beacon receiving station therein illustrated comprises an antenna 45 coupled to a receiver-detector 46 in which the beacon energy picked up by antenna 45 is selected, amplified as necessary, and then demodulated to yield the trains of pulses corresponding respectively to the bearing signal, the reference signal, and the synchronising signal. All these pulses are delivered to a pulse channel selector 47 which routes the train of bearing signal pulses over line 48 to a harmonic selector 49, and simultaneously routes the train of reference signal pulses over line 50 to pulse demodulator 51. Channel selector 47 may be of any suitable type already known in the art of pulse multi-channel communication, and detailed description is therefore unnecessary in the present specification. The same remark applies to pulse demodulator 51, the output of which is the desired reference signal wave of frequency $p$.

The bearing-signal train applied to harmonic selector 49 consists, in the present example, of a train of 1 microsecond pulses of repetition frequency 10 kc./s. time-position modulated at commutation frequency $p$, the phase of this modulation being uniquely determined by the direction of propagation of the received energy. The range of the time-position modulation is determined by the radius of the beacon array, and in the present example is:

$T = \pm$ (radius of array)/(velocity of propagation)

$= \pm \dfrac{450 \text{ metres}}{300,000,000 \text{ metres/sec.}}$ $= \pm 1.5$ microsecond.

The train of pulses thus modulated is, by Fourier analysis, equivalent to a sine wave of frequency equal to the pulse repetition frequency, together with a number of harmonics thereof, each of these waves being time modulated through the same range as the pulses i. e. through $\pm 1.5$ microseconds, at the antenna commutation frequency $p$. Now time modulation of a sine wave is simply another way of describing phase modulation, the phase excursion $\varphi$ for a wave of frequency $f$ time modulated through range T being given by $\varphi = 2\pi f T$ radians In the present example, therefore, the Fourier component of fundamental frequency—10 kc./s.—is phase modulated through a range of approximately $\pm 0.1$ radian, and the Fourier harmonic component of order N is phase-modulated through a range of $\pm 0.1$ N radian. Now, the pulse duration of 1 microsecond and the pulse repetition frequency of 10 kc./s. result in a strong fiftieth Fourier harmonic component which can be readily selected by filter means. This fiftieth harmonic is phase modulated through an excursion of approximately $\pm 5$ radians, as explained above, and therefore carries with it high order sidebands of appreciable magnitude. Accordingly, the bearing wave pulse train selected in channel selector 47 is applied over line 48 to harmonic selecting filter 52 which is arranged to select the fiftieth harmonic of the 10 kc./s. pulse train. At the output of filter 52, we obtain a 500 kc./s. wave, phase modulated through a range of $\pm 5$ radians at the antenna commutation frequency, which is analogous to the wave obtained in the first embodiment at the output of filter 17 (Fig. 1) except that it is derived not from the carrier wave per se but from the modulation imposed thereon at the beacon.

While this pulse-produced 500 kc./s. wave could be processed in the same manner as described in connection with Fig. 1, and made to yield a bearing wave of frequency $p$ obtained by pulse coincidence technique from two discriminator output waves the frequencies of which are multiples of $p$, the multiples being prime to another, a slightly different treatment has here been adopted. Referring against to Fig. 4, it will be seen that the output from harmonic selector 52 is applied to a discriminator 53 which as before is arranged to deliver both the odd and the even harmonics of the phase-modulation frequency which result from beats in the discriminator between the carrier and the sidebands comprised in the frequency content of the discriminator input wave. This discriminator may be of the type already described with reference to Fig. 2. The odd-harmonic output from discriminator 53 (Fig. 4) is applied to filters 54 and 55, which select respectively the third and the fifth harmonics ($3p$ and $5p$) of the beacon commutation frequency $p$. The even-harmonic output from discriminator 53 is applied to filter 56, which selects the fourth harmonic ($4p$) of the beacon commutation frequency. It will be noted that the selected harmonics—third, fourth, and fifth—are all prime to one another. The sine-wave outputs from filters 54, 55, and 56 are applied to respective pulse-producing converters 57, 58, and 59 (similar to the pulse producing converters 19 and 21 of Fig. 1), in which they are converted into respective pulse trains of the same repetition frequencies as the originating waves, the timing of the trains furnished by producers 57 and 59 being adjustable over a limited range by means of phase adjusters 60 and 61. The pulse duration is conveniently made the same for all three trains, and is a fraction of the difference between the periodicities of the two higher harmonics i. e. the fourth and the fifth; in the present embodiment this difference amounts to 45 microseconds, and the pulse duration has been made 20 microseconds. All three trains of pulses are applied to a coincidence circuit 62, which releases output only when coincidence occurs between three pulses, one for each train. Since the pulse repetition frequencies of the three trains are prime to another, and since the pulse durations are so small relative to the pulse intervals, this coincidence can occur only at a repetition frequency equal to the commutation frequency. The pulse output from the coincidence circuit 62 is applied to a low pass filter 63, in which it is converted to a sine wave which forms the final comparison wave, and is phase-compared in indicator 64 (similar to indicator 25 of Fig. 1) with the reference wave from pulse demodulator 51 the result of the phase comparison giving an unambiguous indication of the direction of propagation of the received energy. The accuracy of this indication is determined jointly by the timing of the pulse trains derived from the third, fourth, and fifth order sidebands of a phase modulated wave which itself is constituted by the fiftieth harmonic component of the time-modulated train of pulse energy received from the beacon array.

It will be observed that the indication obtained by the use of the pulse coincidence technique using three sets of pulses will in general represent the average of the indications which could be derived from each set separately. If any one of the three sets of narrow pulses is even moderately misphased, under the influence of an interfering signal, the coincidence circuit 62 will fail to produce any output, and no indication will be obtainable. Thus, the arrangement is one which either yields an accurate indication, or does not yield an indication at all if circumstances are such that there is risk of considerable error. This property is of considerable importance in equipment giving an automatic indication the quality of which cannot be gauged by the operator.

While the principles of the invention have been described above in connection with specific embodiments and particular modifications thereof, it is to be clearly understood that this description is made only by way of example and not as a limitation on the scope of the invention.

What I claim is:

1. A radio navigation system comprising means for receiving high frequency energy, means for phase modulating said energy at a given frequency by cyclically changing the length of the space-path over which said energy is received, said received energy including sets of modulation sidebands of order higher than unity, and means for deriving from the received modulated energy a wave of said given frequency, the phase of which wave is determined by at least two sets of sidebands of different order and is representative of the direction of propagation of the received energy.

2. A radio navigation system comprising at a receiving station means for receiving high frequency energy which is phase modulated at a given low frequency by reason of cyclical change in the length of the space path over which said energy is received, whereby said received energy includes sets of modulation sidebands of higher order than unity, means for deriving from said received modulated energy a plurality of trains of sharp pulses, each train timed by a different order of said modulation sidebands, said trains having respective repetition frequencies which are predetermined integral multiples of said low frequency, at least two of said multiples being prime to one another, means for relatively adjusting the timing of said trains to bring corresponding pulses of each train into overlapping time relationship, and means for applying the resultant coincidence-pulses for phase comparison with a reference wave of said given frequency, the result of said comparison being unambiguously representative of the direction of propagation of said received energy.

3. A system according to claim 2, in which said receiving station is a direction-finding station, and in which said means for receiving high frequency energy comprises an array of at least three antennae uniformly spaced round the circumference of a circle, a radio receiver, commutating means for coupling individual antennae of said array to said receiver in regular succession round said array at said given low frequency to cause said change in path length, the output of said receiver serving as said received modulated energy, said station further comprising wave generating means synchronised with said commutating means and arranged to provide said reference wave.

4. A system according to claim 2, in which said station is a direction-finding station, and in which said means for receiving high frequency energy comprises an array of at least three antennae uniformly spaced round the circumference of a circle, a reference antenna, a radio receiver having two like channels, commutating means for coupling the antennae of said array to one of said receiver channels one antenna at a time in regular succession round the array at said given low frequency to effect said cyclical change in path length, means for coupling said reference antenna to the other of said receiver channels, means for shifting the frequency of the output of said other channel by a fixed amount P, means for mixing the output of said one channel with the frequency-shifted output of said other channels, and means for selecting from the output of said mixer energy of carrier frequency equal to said amount P, said selected energy serving as said received modulated energy, said station further comprising wave generating means synchronised with said commutating means and arranged to provide said reference wave.

5. A system according to claim 2 in which said station comprises a beacon receiver station, and said means for receiving high frequency energy comprises means for receiving the signals radiated by said beacon, detector means for recovering the modulation envelope of said signals, pulse channel selecting means arranged to separate out from said recovered envelope to bearing-signal pulses and the reference-signal pulses, and means for selecting from said separated-out bearing signal pulses a predetermined harmonic component which component serves as said received modulated energy, said station further comprising means for deriving said reference wave from said separated-out reference-signal pulses.

6. A system according to claim 2 in which the pulse duration period of said sharp pulses is less than the difference between the repetition periods of the train of highest repetition frequency and the train of next highest repetition frequency.

7. A system according to claim 6 in which the pulse duration period is the same for all said trains.

8. A system according to claim 6 in which the pulse duration period of the train of lowest repetition frequency is greater than the pulse duration period of the train of highest repetition frequency.

9. A system according to claim 2 in which said means for deriving a plurality of pulse trains comprises a phase discriminator arranged to provide demodulation products corresponding to beats between the carrier component of the input wave and its modulation sidebands of orders equal to respective ones of said predetermined integral multiples, means for applying said received modulated energy as input to said discriminator, means for separately selecting the resultant demodulation products of respective frequencies equal to said predetermined integral multiples of said given frequency, a plurality of pulse-producing converters, and means for applying each said selected demodulation product to a respective one of said converters for conversion into a respective one of said pulse trains.

10. A system according to claim 9 in which said means for relatively adjusting the timing of said pulse trains comprises a number of phase adjusters one less than said plurality of pulse trains, each said phase adjuster being connected in series with the input to a respective one of said pulse-producing converters other than that one which produces the pulse train of highest repetition frequency.

11. A system according to claim 9 in which said discriminator arrangement comprises means for dividing said input wave into two parts, means for combining said two parts in quadrature phase relationship to obtain sum and difference combination first resultant waves, means for differentially rectifying said first resultant waves to obtain said demodulation products corresponding to beats between the carrier component and the modulation sidebands of odd order, means for combining said two parts in cophasal relationship to obtain sum and difference second resultant waves, and means for differentially rectifying said second resultant waves to obtain demodulation products corresponding to beats between the carrier component and the modulation sidebands of even order.

12. A system according to claim 9, in which said discriminator comprises an input transformer having an input winding, a first output winding, and a second output winding having two terminals, a delay network having a phase shift which is an odd multiple of 90°, which odd multiple may be unity, a differential transformer having a primary winding and a centre-tapped secondary winding, said first output winding being coupled through said delay network to said primary winding and one terminal of said second output winding being connected to the centre-tap of said secondary winding, a phase-splitting bridge network, means for connecting two diagonally opposite corners of said bridge to respective ends of said centre tapped secondary winding, four like-poled rectifier circuits each comprising a rectifier having one pole connected to a respective corner of said bridge and the other pole connected by a resistance and condenser in parallel to the other terminal of said second output winding, and four output terminals coupled each to a respective rectifier circuit at the junction of said other pole and said parallel resistance and condenser.

No references cited.